United States Patent
Rondeau et al.

(10) Patent No.: US 9,588,220 B2
(45) Date of Patent: Mar. 7, 2017

(54) LIDAR COMPRISING OPTICAL MEANS FOR DEICING OR PREVENTING ICING

(71) Applicant: THALES, Courbevoie (FR)

(72) Inventors: Philippe Rondeau, Allex (FR); Nicolas Bastien, Saint Bonnet de Chavagne (FR); Patrick Feneyrou, Igny (FR); Jean-Pierre Schlotterbeck, Rochefort-Sampson (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/721,950

(22) Filed: May 26, 2015

(65) Prior Publication Data

US 2015/0346328 A1    Dec. 3, 2015

(30) Foreign Application Priority Data

May 28, 2014 (FR) .................................... 14 01220

(51) Int. Cl.
| | | |
|---|---|---|
| *G01S 7/481* | (2006.01) | |
| *G01S 17/08* | (2006.01) | |
| *G01P 5/26* | (2006.01) | |
| *G01S 17/95* | (2006.01) | |

(52) U.S. Cl.
CPC ............. *G01S 7/4814* (2013.01); *G01P 5/26* (2013.01); *G01S 7/481* (2013.01); *G01S 17/08* (2013.01); *G01S 17/95* (2013.01)

(58) Field of Classification Search
CPC ........ G01S 7/4814; G01S 17/08; G01S 7/481; G01S 17/95; G01P 5/26; G01P 5/02
See application file for complete search history.

(56) References Cited

U.S. PATENT DOCUMENTS

| | | | | |
|---|---|---|---|---|
| 6,091,335 A | * | 7/2000 | Breda ..................... | B64D 15/20 244/134 F |
| 6,206,325 B1 | * | 3/2001 | Nunnally ............... | B64D 15/00 244/134 E |
| 6,377,207 B1 | * | 4/2002 | Solheim .................. | G01W 1/02 324/640 |
| 7,986,408 B2 | * | 7/2011 | Ray ........................ | B64D 15/20 356/342 |
| 8,796,627 B2 | * | 8/2014 | Rockwell ........... | G01N 21/4738 250/341.8 |

(Continued)

FOREIGN PATENT DOCUMENTS

| | | |
|---|---|---|
| JP | 2013001611 A | 1/2013 |
| WO | 2013/139347 A1 | 9/2013 |

OTHER PUBLICATIONS

French Search Report issued in French application No. 1401220, dated Mar. 3, 2015 (7 pages).

*Primary Examiner* — Sang Nguyen

(74) *Attorney, Agent, or Firm* — Michael J. Donohue; Davis Wright Tremaine LLP

(57) ABSTRACT

The general field of the invention is that of optical lidars comprising an optical porthole and operating at a first wavelength. The optical porthole of the lidar according to the invention comprises a layer or a sheet made of an optical material. The lidar comprises means for illuminating said layer or said sheet at a second wavelength different from the first wavelength, said material being transparent at the first wavelength and absorbent at the second wavelength, said second wavelength being located in the visible spectrum.

6 Claims, 2 Drawing Sheets

(56) References Cited

U.S. PATENT DOCUMENTS

| | | | |
|---|---|---|---|
| 2004/0174496 A1* | 9/2004 | Ji | G06F 3/013 |
| | | | 351/209 |
| 2012/0111992 A1* | 5/2012 | Fry | F41G 7/2253 |
| | | | 244/3.16 |
| 2014/0146511 A1* | 5/2014 | Czarny | G02B 5/204 |
| | | | 361/816 |
| 2015/0168439 A1* | 6/2015 | Genevrier | G01P 5/14 |
| | | | 356/28 |

* cited by examiner

LIDAR COMPRISING OPTICAL MEANS FOR DEICING OR PREVENTING ICING

BACKGROUND OF THE INVENTION

Field of the Invention

The field of the invention is that of Doppler lidar systems installed onboard aircraft. These systems allow airspeed to be measured at a certain distance from said aircraft.

Description of the Related Art

This technique is based on the measurement of the Doppler shift induced by particles present in the atmosphere in the backscattered laser wave. The use of a plurality of laser beams or a beam-scanning system allows the three components of the airspeed vector to be determined in the entire flight envelope of the carrier.

These systems require the use of an optical porthole that is almost conformal with the skin of the carrier. This porthole allows the laser beam to pass into the atmosphere without altering its optical and geometric properties and without attenuating the emitted power.

On account of the operating conditions of aircraft, a suitable heating system is indispensable in order to prevent icing of the porthole when atmospheric temperature conditions combine with the presence of water. Icing has the effect of degrading the optical performance of the porthole and therefore of decreasing the precision of the measurement of airspeed. Under certain severe icing conditions, the measurement may even be completely lost.

To prevent icing of the porthole, a number of technical solutions exist. A first solution consists in using conduction to heat the porthole. Electrical resistors are placed making contact with the supporting structure of the porthole and allow the required thermal power to be generated. A second solution consists in depositing a resistive film on the surface or in the thickness of the porthole. This second solution is, for example, used to deice aircraft windscreens. A thin resistive film is then deposited between two sheets forming the windscreen.

The main disadvantages of these two solutions are the following. The first solution generates substantial thermal stresses due to the localized injection of thermal power. These stresses deform the wavefront of the transmitted optical wave on emission and reception. This deformation may lead to a substantial decrease in the received signal level and degrade measurement precision or even prevent the measurement if the signal-to-noise ratio is too greatly degraded. Furthermore, it is not envisageable to use this technique to deice large optical areas. Lastly, the heating of the frame of the porthole represents a substantial source of power consumption due to the dissipation over a larger area of the thermal power delivered. One solution allowing these various drawbacks to be partially mitigated is the use of a porthole made of sapphire. This material has a very high thermal conductivity. If the porthole has a sufficiently large area, the heating resistors may be adhesively bonded directly to the optically unuseful surface of the sapphire porthole. However, employing sapphire has a drawback: it is birefringent. If polarized light is employed, the useful signal level may decrease if this birefringence is not correctly accounted for.

The main drawback of the second solution is a loss of transmission due to the reflectivity of the heated films.

SUMMARY OF THE INVENTION

The lidar according to invention does not have these drawbacks. It comprises an optical porthole that is both transparent at the emission wavelengths of the lidar and absorbent in a second wavelength range. It is thus possible to heat it by illuminating it in this second spectral range. More precisely, the subject of the invention is an optical lidar comprising an optical porthole and operating at a first wavelength, characterized in that the porthole comprises a layer or a sheet made of an optical material and means for illuminating said layer or said sheet at a second wavelength different from the first wavelength, said material being transparent at the first wavelength and absorbent at the second wavelength.

Advantageously, the porthole only comprises a sheet made of said optical material.

Advantageously, the illuminating means having known emission patterns, they are distributed, depending on said emission patterns, so as to optimize the uniformity of the illumination of the porthole.

Advantageously, the illuminating means are light-emitting diodes.

Advantageously, the first wavelength is located in the near infrared and the second wavelength in the visible spectrum.

Advantageously, the first wavelength is located in the ultraviolet and the second wavelength in the visible or near infrared.

Advantageously, the material is the glass FLG850 made by Schott®.

BRIEF DESCRIPTION OF THE DRAWINGS

The invention will be better understood and other advantages will become apparent on reading the following description, which is given by way of nonlimiting example, and by virtue of the appended figures in which.

DETAILED DESCRIPTION OF THE INVENTION

Figure 1:
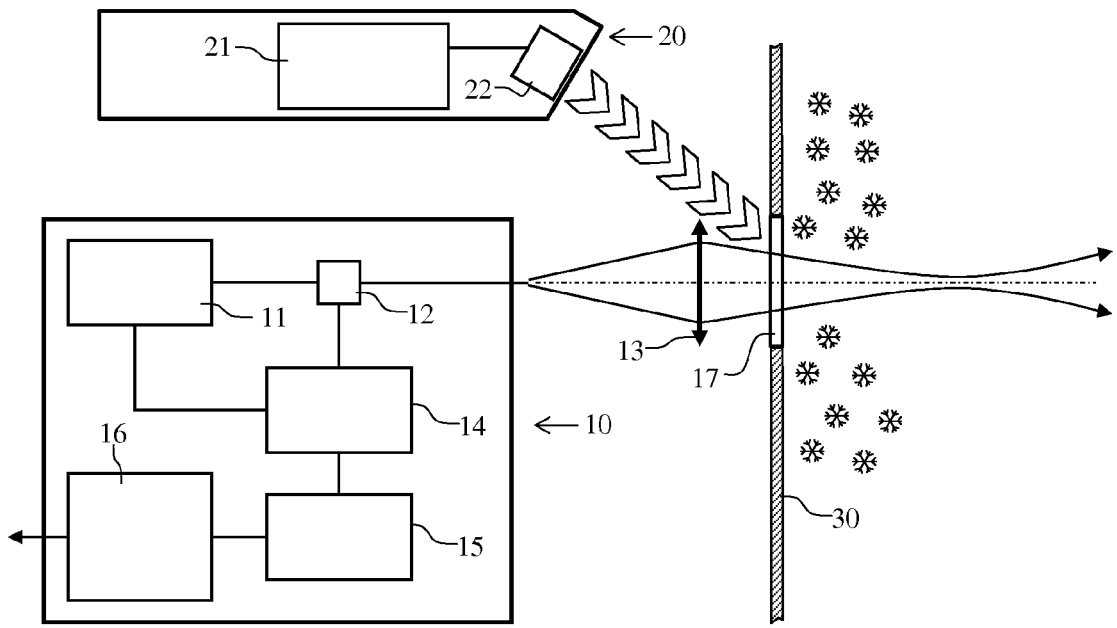
FIG. 1 shows the general architecture of a lidar according to the invention.

FIG. 1 shows the general architecture of a lidar according to the invention, fitted onboard an aircraft. It comprises a first assembly 10 that carries out the actual speed measurement. This assembly comprises an emitting laser source 11, an optical splitter 12, an optical transceiver 13, an interferometer 14, detecting means 15 and a signal processor 16.

In the case shown in FIG. 1, the optical transceiver 13 is a single lens placed upstream of a porthole 17 separating the lidar and the exterior. The porthole 17 is mounted on the skin 30 of the aircraft. Icing conditions have been represented by snowflakes in FIG. 1. The optical transceiver 13 focuses the emission radiation at a set distance from the skin of the aircraft. It is known that, because of the Doppler effect, optical radiation backscattered by atmospheric particles present at the focal point is slightly shifted in frequency by a value proportional to the relative speed of the particles relative to the aircraft.

The received radiation passes through the optical splitter 12 and interferes with a fraction of the radiation emitted by the emitting laser source 11 in the interferometer 14. A beat signal beating at the Doppler frequency is obtained. Said signal is received by a photodetection assembly 15. The electronic assembly 16 allows the signal thus obtained to be processed and the relative speed of the aircraft to be calculated from knowledge of the beat frequency.

The lidar according to the invention comprises a second assembly 20 said to be for deicing the porthole 17. It essentially comprises control, management and power supply means 21 and means 22 for illuminating the porthole. The radiation emitted by the illuminating means 22 is represented by chevrons in FIG. 1.

The operating principle is the following. The porthole comprises a layer of material or is made of a material the absorption coefficient of which varies strongly as a function of wavelength. Thus, it is possible to choose the wavelength of the source 22 (this wavelength being sufficiently different from that of the emission wave of the lidar) so that the porthole absorbs the wavelength of the illuminating source 22 and transmits the emission wavelength. On absorbing the light of the source 22, the porthole gets hotter and the deicing function is obtained. If the layer of absorbent material is small in thickness, the heating is essentially areal; if the entirety of the porthole is made of absorbent material, the heating is essentially voluminal. This second solution is preferable to the first and allows more uniform absorption and therefore a higher quality transmitted wavefront to be obtained.

Figure 2:
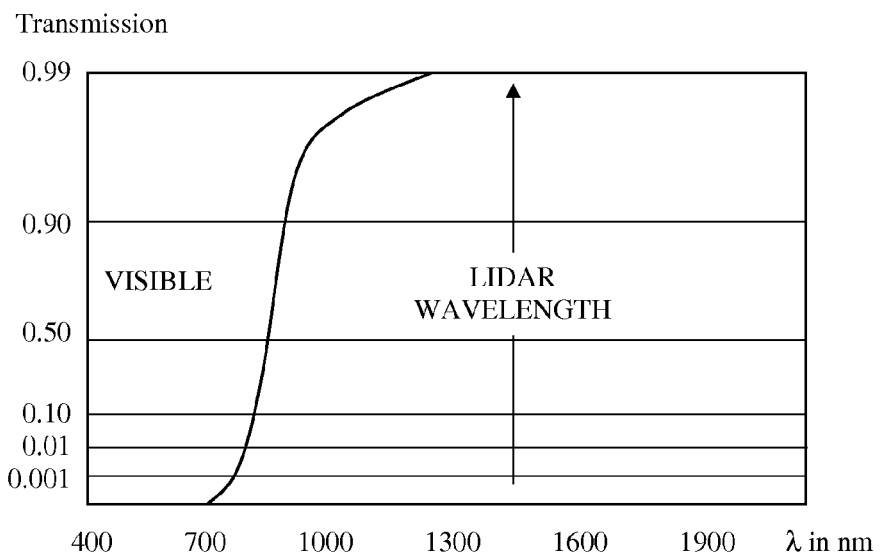
FIG. 2 shows the spectral transmission of the material of an optical porthole according to the invention.

Optical materials exhibiting this absorption property are essentially coloured glasses. By way of example, FIG. 2 shows the variation in absorption of the coloured glass FLG850 sold by Schott®. The transmission of this coloured glass is given for wavelengths comprised between 400 nanometers and 2000 nanometers. The transmission scale is logarithmic. This material has a cut-off wavelength centred on 850 nanometers. Below this wavelength the material absorbs light, and above this wavelength it is transparent. For example, if the emission wavelength of the lidar is located in the near infrared at about 1550 nanometers, it is entirely transmitted by the glass FLG850. In contrast, if the illuminating and heating means emit in the visible, the emitted light is entirely absorbed.

In the case of lidar using an ultraviolet wavelength rather than an infrared wavelength, coloured glasses absorbing visible and infrared radiation while transmitting ultraviolet radiation will possibly be chosen.

Figure 3:
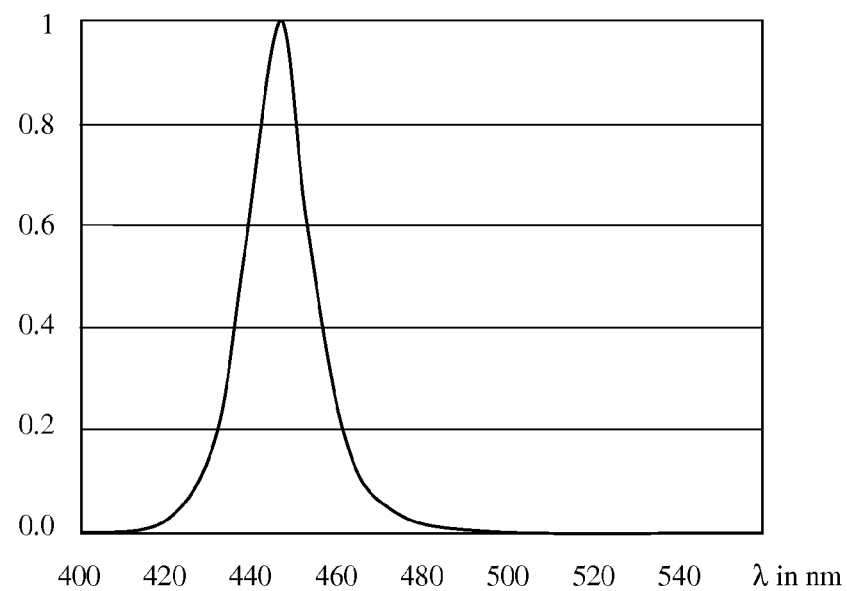
FIG. 3 shows the spectral emission of means for illuminating said optical porthole according to the invention.

The sources 22 of illumination may be light-emitting diodes. By way of example, FIG. 3 shows the emission spectrum of a light-emitting diode emitting in the blue. The emission is given for wavelengths comprised between 400 nanometers and 560 nanometers. The scale of the emitted power is normalized in FIG. 3. The spectrum comprises an emission peak at 450 nanometers and has a spectral width at mid-height of 25 nanometers. Diodes of this type may emit a luminous flux of several watts with an excellent energy efficiency.

Figure 4:
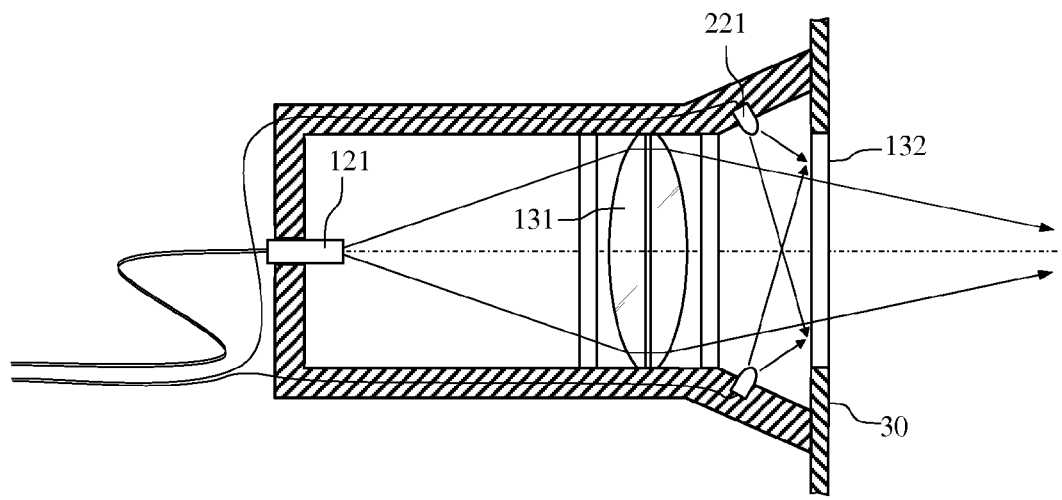
FIG. 4 shows a schematic diagram of an optical lidar head according to the invention.

FIG. 4 shows an example embodiment of an optical transceiver head of a lidar according to the invention. The light is issued from an optical fibre 121 connected to the receiving and emitting means of the lidar. By way of example, the emission wavelength of the lidar is close to 1.55 µm.

The optical head essentially comprises optics 131 and an exit porthole 132.

The porthole 132 is heated by a ring of light-emitting diodes 221 emitting in the visible, i.e. in a wavelength range comprised between 400 nanometers and 800 nanometers. These diodes may emit at a wavelength of 450 nanometers such as described above. These diodes are integrated into the mechanical structure of the optical head. They are placed, depending on their emission patterns, so as to optimize the uniformity of the illumination of the optical porthole 132. A single lens may optionally be associated with each emitter in order to improve the uniformity or effectiveness of the illumination.

The optical porthole may be made of FLG 850. In this case, the transmission of the emission radiation is higher than 99% and the absorption of the radiation emitted by the heating diodes is higher than 99%.

The advantages of the deicing system according to the invention are the following:
 the heating power is absorbed uniformly over the entirety of the area of the porthole, thus preventing problems with thermal stresses and with transmitted wavefront deformation;
 deicing is perfectly limited to the useful zone of the porthole and therefore conduction losses are limited relative to a conductive deicing solution;
 it is possible to provide an antireflective treatment tailored to the emission wavelength of the lidar in order to further limit losses due to reflection from the glass;
 solar radiation emitted essentially in the visible is naturally filtered;
 the system is inexpensive to produce; and
 the system is highly reliable.

What is claimed is:

1. Optical lidar comprising an optical porthole and a laser light source operating at a first wavelength, characterized in that the optical lidar comprises a first assembly for deicing the optical porthole, the porthole comprises comprising a layer or a sheet made of an optical material and means for illuminating the first assembly comprising an illumination source configured to illuminate said layer or said sheet at a second wavelength different from the first wavelength, said material being transparent at the first wavelength and absorbent at the second wavelength, said second wavelength being located in the visible spectrum, on absorbing the light at the second wavelength, the porthole getting hotter.

2. Optical lidar according to claim 1, in which the porthole only comprises a sheet made of said optical material.

3. Optical lidar according to claim 1, in which the illumination source comprises light-emitting diodes.

4. Optical lidar according to claim 3, in which the light-emitting diodes are distributed in a ring.

5. Optical lidar according to claim 1, in which the first wavelength is located in the near infrared.

6. Optical lidar according to claim 1, in which the first wavelength is located in the ultraviolet.

\* \* \* \* \*

UNITED STATES PATENT AND TRADEMARK OFFICE
CERTIFICATE OF CORRECTION

PATENT NO. : 9,588,220 B2  
APPLICATION NO. : 14/721950  
DATED : March 7, 2017  
INVENTOR(S) : Philippe Rondeau et al.

Page 1 of 1

It is certified that error appears in the above-identified patent and that said Letters Patent is hereby corrected as shown below:

On the Title Page

Currently reads as:
(72) Inventors: Philippe Rondeau, Allex (FR);
Nicolas Bastien, Saint Bonnet de Chavagne (FR);
Patrick Feneyrou, Igny (FR);
Jean-Pierre Schlotterbeck, Rochefort-Sampson (FR)

Should read as:
(72) Inventors: Philippe Rondeau, Allex (FR);
Nicolas Bastien, Saint Bonnet de Chavagne (FR);
Patrick Feneyrou, Igny (FR);
Jean-Pierre Schlotterbeck, Rochefort-Samson (FR)

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*